(12) United States Patent
Tanaka et al.

(10) Patent No.: US 7,996,430 B2
(45) Date of Patent: Aug. 9, 2011

(54) FILE RETRIEVAL DEVICE AND FILE RETRIEVAL METHOD

(75) Inventors: Yoshiyuki Tanaka, Hino (JP); Keiichi Ishii, Koganei (JP)

(73) Assignee: Seiko Epson Corporation, Tokyo (JP)

( * ) Notice: Subject to any disclaimer, the term of this patent is extended or adjusted under 35 U.S.C. 154(b) by 808 days.

(21) Appl. No.: 11/895,251

(22) Filed: Aug. 23, 2007

(65) Prior Publication Data

US 2008/0104151 A1    May 1, 2008

(30) Foreign Application Priority Data

Aug. 24, 2006    (JP) ................................. 2006-227440

(51) Int. Cl.
*G06F 17/30* (2006.01)
(52) U.S. Cl. ........................................ 707/796; 707/823
(58) Field of Classification Search .................. 707/205, 707/796, 823
See application file for complete search history.

(56) References Cited

U.S. PATENT DOCUMENTS

| | | | |
|---|---|---|---|
| 5,745,888 A | | 4/1998 | Bauer et al. |
| 6,249,782 B1 * | | 6/2001 | Day et al. .............................. 1/1 |
| 2006/0106838 A1 * | | 5/2006 | Ayediran et al. .............. 707/101 |
| 2006/0155669 A1 * | | 7/2006 | Huang et al. ....................... 707/1 |
| 2006/0200465 A1 * | | 9/2006 | Chuang ............................. 707/6 |

FOREIGN PATENT DOCUMENTS

| | | |
|---|---|---|
| JP | 10-31612 | 2/1998 |
| JP | 2001-092696 | 4/2001 |
| JP | 2005-327257 | 11/2005 |

OTHER PUBLICATIONS

Minoura, Practical Research of File System Demand of Which is Growing for Equipment on Embedded Device Improving with High-Function, Large-Capacity Interface, CQ Publishing Co., pp. 66-81 (2001) (with English translation of the parenthetic part on p. 76).

* cited by examiner

*Primary Examiner* — John Breene
*Assistant Examiner* — Dennis Myint
(74) *Attorney, Agent, or Firm* — Nutter McClennen & Fish LLP; John J. Penny, Jr.

(57) ABSTRACT

A file retrieval device, operable to retrieve a valid file name for reading a plurality of file main bodies from a recording medium in which the plurality of file main bodies and file related information that includes a file names respectively allocated to the plurality of file main bodies and respectively depending on different file systems are recorded and which is coordinated with one file system in advance, the file retrieval device, including: a first extracting unit, operable to extract the file name depending on the file system identical with the one file system from the file related information; a validity deciding unit, operable to decide validity of the file name depending on the file system other than the one file system; a second extracting unit, operable to extract the file name depending on the file system related to the file name decided to be valid by the validity deciding unit for the file main body the file name of which is not extracted by the first extracting unit; and an output unit, operable to output the file names extracted by the first and second extracting units.

5 Claims, 6 Drawing Sheets

```
<?xml version="1.0" encoding="UTF-8"?>
<file:Manifest
    xmlns:file="http://ns.osta.org/manifest/1.0/"
    xmlns:mpv="http://ns.osta.org/mpv/1.0/"
    xmlns:nmf="http://ns.osta.org/nmf/1.0/"
    <nmf:Metadata>
        <ManifestProperties xmlns="http://ns.osta.org/manifest/1.0/">
            <ProfileBag>
                <Profile>http://ns.osta.org/mpv/basic/1.0/</Profile>
            </ProfileBag >
        </ManifestProperties>
    </nmf:Metadata>
...
    <mpv:AssetList>                                                          201                                 205
        <mpv:Still mpv:id="ID001401">
            <mpv:LastURL mpv:filesystem="ISO9660-1">ISO001.JPG</mpv:LastURL>
            <mpv:LastURL mpv:filesystem="NTFS">Ntfs001.jpg</mpv:LastURL>     206
  209  202  <mpv:LastURL mpv:filesystem="FAT16">FAT001.JPG</mpv:LastURL>
        </mpv:Still>
                 203        204                                    207

<mpv:Still mpv:id="ID001404">
            <mpv:LastURL mpv:filesystem="ISO9660-1">ISO002.JPG</mpv:LastURL>
            <mpv:LastURL mpv:filesystem="NTFS">Ntfs002.jpg</mpv:LastURL>
  209      <mpv:LastURL mpv:filesystem="FAT16">FAT002.JPG</mpv:LastURL>
        </mpv:Still>

<mpv:Still mpv:id="ID001407">
            <mpv:LastURL mpv:filesystem="ISO9660-1">ISO003.JPG</mpv:LastURL>
            <mpv:LastURL mpv:filesystem="NTFS">Ntfs003.jpg</mpv:LastURL>
  209      <mpv:LastURL mpv:filesystem="FAT16">FAT003.JPG</mpv:LastURL>
        </mpv:Still>       208
...
        <mpv:Audio mpv:id="ID001500">
            <mpv:LastURL>Waves.wav</mpv:LastURL>
  209   </mpv:Audio>
    </mpv:AssetList>           201
...
</file:Manifest>
```

FIG. 3

| FILE SYSTEM | FEATURE | | | | PRIORITY |
|---|---|---|---|---|---|
| | THE NUMBER OF CHARACTERS | BIG LETTER, SMALL LETTER | OTHERS | CLASSIFICATION | |
| NONE | — | — | — | | 13 LOW |
| UDF | UNLIMITED | NO DIFFERENCE | — | SHORT FILE NAME | 12 |
| Unix | 255 CHARACTERS | HAVING DIFFERENCE | — | LONG FILE NAME | 11 |
| RockRidge | | | | | 10 |
| Windows | | | INCLUDING NTFS, FAT32, FAT16 | | 9 |
| NTFS | | | | | 8 |
| FAT32 | | | | | 7 |
| Joliet | 64 CHARACTERS | | — | | 6 |
| HFS | 32 CHARACTERS | NO DIFFERENCE | | | 5 |
| ISO9660-3 | 31 CHARACTERS | | | | 4 |
| ISO9660-2 | | | | | 3 |
| ISO9660-1 | 11 CHARACTERS (8.3 FORM) | | | SHORT FILE NAME | 2 |
| FAT16 | | | | | 1 HIGH |

FILE RETRIEVAL DEVICE AND FILE RETRIEVAL METHOD

BACKGROUND

1. Field of the Invention

The present invention relates to a retrieving technique of a file recorded on a recording medium.

2. Description of the Related Art

In recent years, recording media of a large capacity as well as a CD (Compact Disk), a DVD (Digital Versatile Disk), a memory card or the like have been increased and many and many kinds of digital content files (files of image data or music data) have been processed by using these media. Ordinarily, these recording media can be read by various kinds of devices such as a computer, a printer, a television or the like. Accordingly, a technique for improving what is called a compatibility between the devices of the media has been developed so that a movement and an exchange through the recording media can be safely carried out.

MVP (Music Photo Video: a registered trademark of Optical Storage Technology Association) is one of it and this is a systematic standard that makes it possible to read the recording media by various kinds of devices. Further, a technique has been also known that the files are efficiently managed by such a standard to improve a convenience (for instance, see JP-A-2005-327257).

In the above-described related art, an importance is attached to efficiency in view of what is called a management, for instance, to efficiently manage the files and improve a convenience and an importance is not attached to en efficiency in view of a speed such as a reading speed (a speed for retrieving a file) of the recording media.

In the case of the MPV standard, information showing the contents of a file main body recorded on the recording media is recorded in the recording media. This information is called a manifest. This information is used so that it can be instantaneously decided what kind of file main body is recorded on the recording media without recognizing the presence thereof one by one. However, in the manifest, a plurality of file names respectively corresponding to a plurality of file systems can be written in one file main body. Therefore, in order to read the file main body, one file name needs to be specified. When there is a file name corresponding to the file system used during recording it in the recording media, the file name can be used unconditionally to use it as a retrieved result. When such a file name does not exist, the plurality of file names described in the manifest are used to recognize whether or not the file main body can be accessed. In such a collating process of the file main body, much time is required. When the number of files is more increased, the influence thereof is the more increased.

SUMMARY

An advantage of some aspects of the invention is to provide a file retrieval device and a file retrieval method that retrieve a valid file name at high speed when recording media is read in which other file names of a plurality of file systems are attached to a file main body and a file name corresponding to the file system of the recording media does not exist.

According to an aspect of the invention, there is provided a file retrieval device, operable to retrieve a valid file name for reading a plurality of file main bodies from a recording medium in which the plurality of file main bodies and file related information that includes a file names respectively allocated to the plurality of file main bodies and respectively depending on different file systems are recorded and which is coordinated with one file system in advance, the file retrieval device, comprising:

a first extracting unit, operable to extract the file name depending on the file system identical with the one file system from the file related information;

a validity deciding unit, operable to decide validity of the file name depending on the file system other than the one file system;

a second extracting unit, operable to extract the file name depending on the file system related to the file name decided to be valid by the validity deciding unit for the file main body the file name of which is not extracted by the first extracting unit; and an output unit, operable to output the file names extracted by the first and second extracting units.

According to a preferred embodiment, the validity deciding unit may specify the file system in accordance with a priority determined in advance and decide the validity of the file name depending on the specified file system.

According to a preferred embodiment, the priority may be determined in such a way the file system having a smaller number of the maximum number of characters of the file name has the higher priority.

According to a preferred embodiment, the validity deciding unit may access the file main body to which the file name is allocated in accordance with the file name depending on the file system other than the one file system, and when the validity deciding unit can normally access the file main body, the validity deciding unit may decide that the file name is valid.

The present disclosure relates to the subject matter contained in Japanese patent application No. 2006-227440 filed in Japan on Aug. 24, 2006 which is expressly incorporated herein by reference in its entirety.

BRIEF DESCRIPTION OF THE DRAWINGS

The invention will be described with reference to the accompanying drawings, wherein like numbers reference like elements.

DESCRIPTION OF EXEMPLARY EMBODIMENTS

Now, a media reading device according to one embodiment of the present invention will be described below by referring to the drawings.

Figure 1:
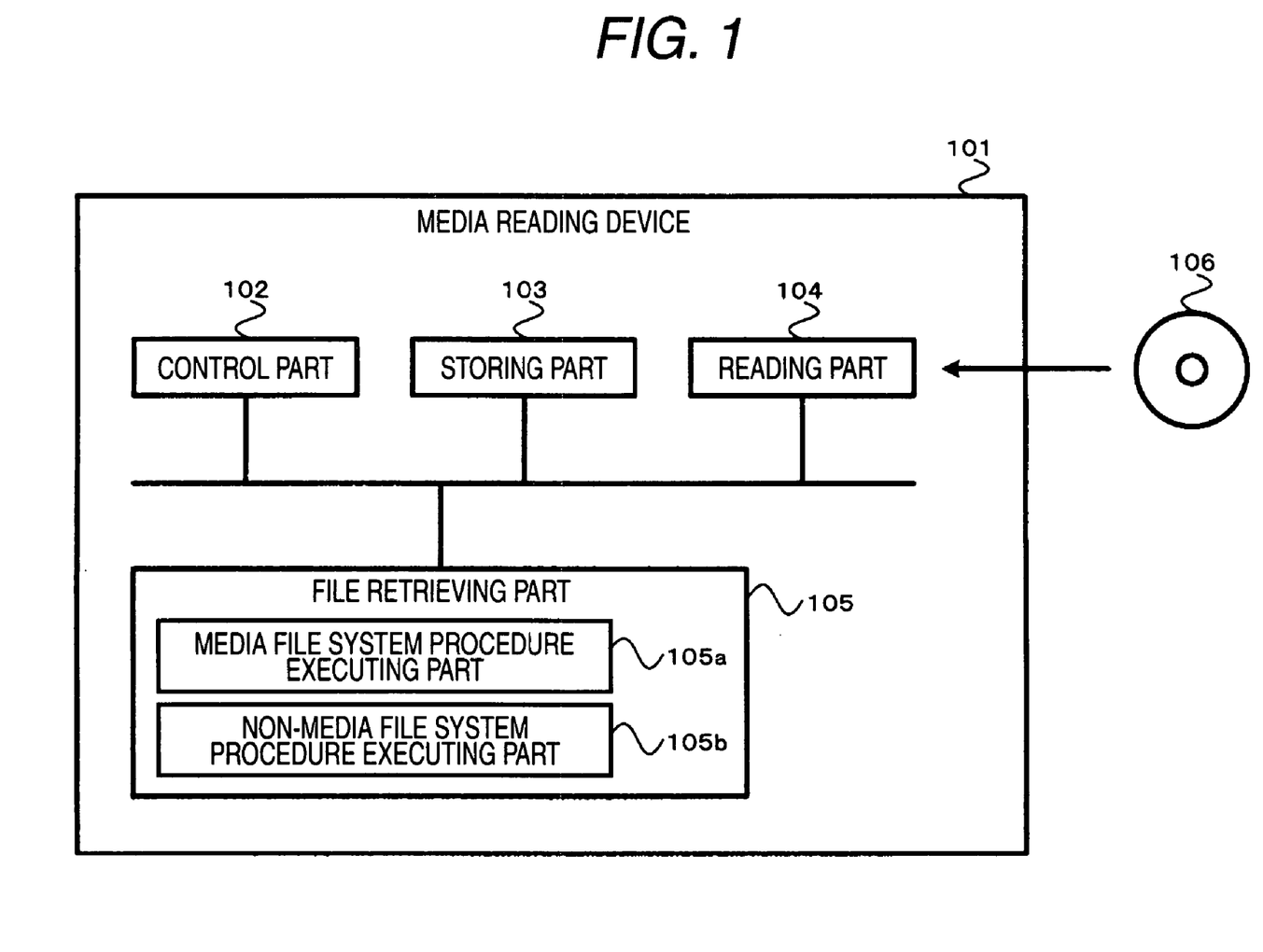
FIG. 1 is a schematic diagram of a structural example of a media reading device according to one embodiment of the present invention.

FIG. 1 is a schematic diagram of a structural example of a media reading device according to the embodiment of the present invention.

The media reading device 101 according to the embodiment reads a recording media 106 to retrieve a file main body recorded on the recording media 106 at high speed and read an actual file main body in accordance with a result. The media reading device 101 includes a function as a file retrieval device for retrieving a file name that can be read from the recording media 106.

In the recording media 106, a file main body as an object to be retrieved (for instance, an image file or a music file or the like) and information showing the contents of the file main body (refer it to as "file related information", hereinafter) are recorded. Further, to the recording media 106, one file system (refer it to as a "file system of media" hereinafter) is allocated. This file system means a file system used when data is recorded on the recording media 106. The media reading device 101 uses the file related information to retrieve a file at high speed.

The file related information indicates information for showing a kind or a position of the file main body recorded on the recording media and includes at least a file name for specifying the file main body and a file system that can use the file name. Here, the file name means a file name that can specify the file main body and, for instance, a file name including path information when the file main body is recorded in a tree structure. Further, the file system includes, for instance, FAT16, FAT32, NTFS, HFS, etc. Accordingly, the media reading device 101 can consider a media recorded in accordance with, for instance, an MPV standard to be an object to be read. In this case, a manifest in the MPV standard corresponds to the file related information.

In the file related information, a plurality of file names depending on the file system can be described for one file main body. In the plurality of file names, valid file names that can access an actual file main body and invalid file names that cannot access the file main body are mixed owing to a relation of the media to the file system. A retrieval of the file carried out by the media reading device 101 is to find out a valid file name relative to the file main body recorded in the recording media 106. Accordingly, the list of the valid file names obtained thereby is a retrieved result. However, as can be understood from a below-described explanation, whether or not all file main bodies can be actually accessed is not recognized. In a part of the file main bodies, a file name assumed to be accessed with high possibility is regarded as a retrieved result. Therefore, an access by all the file names included in the retrieved result is not assured. For convenience sake, the file names including the file name assumed to be accessed with high possibility are referred to as valid file names.

In order to retrieve such a recording media 106, the media reading device 101 includes a control part 102, a storing part 103, a reading part 104 and a file retrieving part 105.

The control part 102 controls the entire operation of the media reading device 101 to carry out a retrieving process of the file main body. Specifically, the control part 102 controls the reading part 104 to read information recorded on the recording media 106, then controls the file retrieving part 105 to retrieve the valid file in accordance with the read information and controls the storing part 103 to store the result thereof to carry out the retrieving process.

The storing part 103 stores information necessary for retrieving the file or the retrieved result obtained by retrieving the file. The information necessary for retrieving the file that is stored in the storing part 103 includes a priority table for determining a sequence of file systems to be retrieved or information showing a validity or an invalidity of the file system (they will be described below).

The reading part 104 reads the information recorded on the recording media 106. As the information to be read, for instance, the file related information or the file systems of the media or the like are exemplified. Since the file related information and the file systems of the media are the information necessary for retrieving the file, the file related information and the file systems of the media are read by the reading part 104 and then supplied to the file retrieving part 105. Further, the reading part 104 decides whether the filename as an object is valid so that the file name can access the actual file main body or invalid so that the file name cannot access the actual file main body. That is, the reading part carries out a collating process for recognizing the presence of the file main body designated by the file name or recognizing whether or not the file main body is the same as shown by the information. This collating process is carried out by, for instance, recognizing whether or not the actual file main body can be opened by the file name.

The file retrieving part 105 retrieves the file main body recorded on the recording media 106 in accordance with the information read from the recording media 106 by the reading part 104. Specifically, the file retrieving part 105 refers to the file related information and the file systems of the media and the priority table stored in the storing part 103 to retrieve the valid file names of all the file main bodies recorded on the recording media 106. Then, the list of the file names obtained as the retrieved result is stored in the storing part 103.

The file retrieving part 105 includes a media file system procedure executing part 105a and a non-media file system procedure executing part 105b. These parts are executing parts for carrying out the retrieving processes of the file names by respectively different procedures (described below). The file retrieving part 105 obtains the retrieved result by the combination of these retrieving processes. Namely, when a desired file name is not found by the retrieving process carried out by the media file system procedure executing part 105a, the file retrieving part 105 obtains the retrieved result by the retrieving process carried out by the non-media file system procedure executing part 105b.

The media file system procedure executing part 105a retrieves the file name in accordance with a below-described media file system procedure. Namely, the media file system procedure executing part 105a retrieves whether or not there is a file name corresponding to the file system coinciding with the file system of the media among a plurality of file names for the one file main body described in the file related information. If such a file name is found out, this is regarded as the retrieved result of the file main body. Here, the collating process is not carried out for recognizing the presence of the file main body designated by the file name or whether or not the file main body is the same as indicated by the information. That is, the media file system procedure executing part 105a preferentially takes a reliability of the file system of the media and saves the collating process to carry out the retrieving process at high speed. If there is an error in the file system, the file name, or the recorded file main body, the error is permitted to obtain the retrieved result. In this case, the media reading device 101 may meet the error by carrying out an error process when the media reading device actually reads the file main body having the error. This is based on a fact that to obtain the retrieved result at high speed by relying on the file system as described above is more advantageous than to collate all file main bodies and take much time in order to eliminate such an error.

On the other hand, the non-media file system procedure executing part 105b retrieves the file name in accordance with a below-described non-media file system procedure. That is, this procedure is to retrieve a file name that can access the actual file main body or may possibly access the file main body in file names corresponding to other file systems (non-media file systems) than the file system of the media among a plurality of file names for the one file main body described in the file related information. This procedure is carried out on the basis of below-described two principles.

Namely, according to a first principle, even when the file system as an object is the non-media file system, if this file system is valid relative to the recording media 106, the system is regarded as a valid file system and all file names corresponding to the file system are considered to be valid. This principle may be said to be a principle that preferentially takes the reliability of the file system. Specifically, after the collating process is carried out once to the file name corresponding to a certain file system to decide whether the file name is valid or invalid, the decided result is applied to all the file names corresponding to the same file system. For instance, when the collating process is carried out to FN1 of three file names FN1, FN2 and FN3 whose file systems are completely the same, and accordingly, the actual file main body can be accessed, FN2 and FN3 are also regarded as the valid file names in addition to FN1. On the contrary, when the actual file main body cannot be accessed, all FN1, FN2 and FN3 are regarded as the invalid file names.

According to a second principle, when a retrieval is carried out on the basis of the first principle, the retrieval is performed in accordance with the priority of the file systems that the sequence of the file systems to be retrieved is previously determined. For instance, when three file names respectively corresponding to three file systems of FS1, FS2 and FS3 are attached to a certain file main body, if the priority of the file systems is previously determined in such a way that FS2 is higher than FS1 and FS1 is higher than FS3, the collating process of the file name corresponding to FS2 is initially carried out (Here, when the validity or the invalidity of FS2 is already decided, the collating process does not need to be carried out in accordance with the first principle). As result, when the file name is decided to be invalid, the validity or the invalidity of the file name corresponding to FS1 is decided. In such a way, when the retrieving process is advanced in accordance with the priority of the file systems to find the valid file name or complete the decision of all the file names, the retrieving process is finished.

The structure of the media reading device 101 is described above, and the media reading device 101 may be realized by, for instance, a general-purpose computer such as a personal computer. In this case, the retrieving process carried out by the file retrieving part 105 can be realized by, for instance, a computer program, an ASIC (Application Specific Integrated Circuit) or the combination of the program and the ASIC.

Now, a case that data is recorded on the recording media 106 on the basis of the MPV standard is assumed and more specifically described below.

Figure 2:
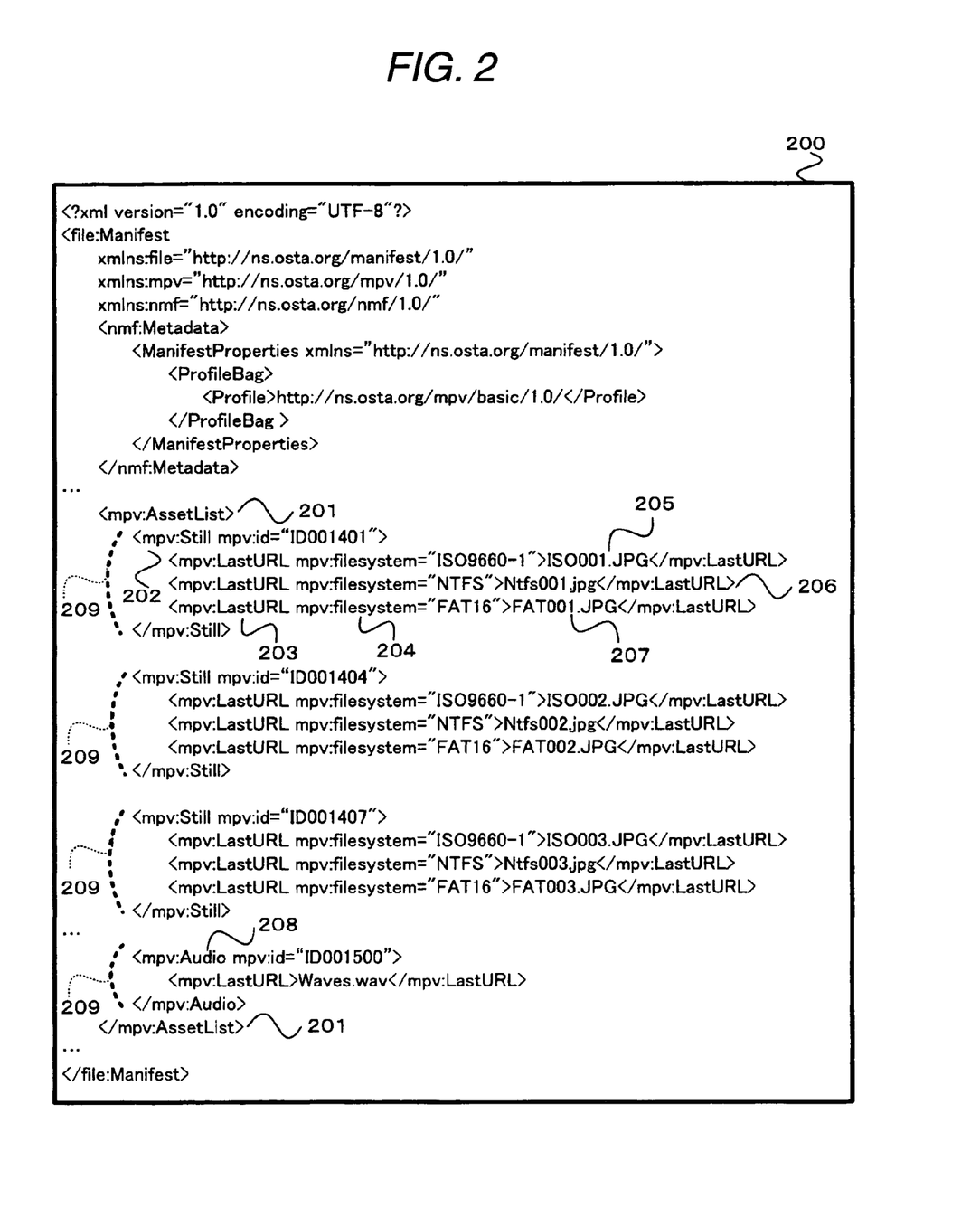
FIG. 2 is a diagram showing one example of the described contents of a manifest.

As described above, in the MPV standard, a file called a manifest corresponds to the file related information. The manifest indicates information related to the contents of the file main body recorded on the recording media 106 that is described in an XML form. FIG. 2 shows one example of the manifest 200.

In the manifest 200, in a range enclosed by an AssetList tag 201, information showing what kind of file main body is recorded in the recording media 106 is recorded.

For instance, a Still tag 202 shows that one still image file (ID designates ID001401) is recorded on the recording media 106. Further, an Audio tag 208 shows that one moving image file (ID designates ID001500) is recorded in the recording media 106. In the ranges enclosed by the Still tag 202 and the Audio tag 208, the detailed information of the respective file main bodies is described.

As the detailed information, the file name of the file main body can be described by a LastURL tag 203. Further, a file system tag 204 is used together with the LastURL tag 203, so that the file name and the file system that can use the file name can be described together. Thus, a plurality of file names depending on the file system can be described for one file body. In FIG. 2, in the still image file having the ID of ID001401, file names ISO001. JPG205, Ntfs001.jpg206 and FAT001.JPG207 in the cases of three file systems of ISO9660-1, NTFS and FAT16 are respectively described.

As can be understood from the above description, when the media reading device 101 retrieves the file main body on the basis of the manifest 200, the media reading device 101 firstly grasps the information of the file main body (refer it to as "file main body information", hereinafter) 209 described in the recording media 206 by using the Still tag 202 or the Audio tag 208 as a key. Then, the media reading device 101 grasps the file name from the respective file main body information 209 by using the LastURL tag 203 as the key. When a plurality of file names are described, the media reading device 101 finds out one valid file name among them. In the case of the manifest 200 in FIG. 2, for the still image file having the ID of ID001401, one file name is selected from the three file names of ISO001. JPG205, Ntfs001.jpg206 and FAT001.JPG207. However, when it is decided that any of the file names is invalid, the still image file is not included in the retrieved result.

Figure 3:
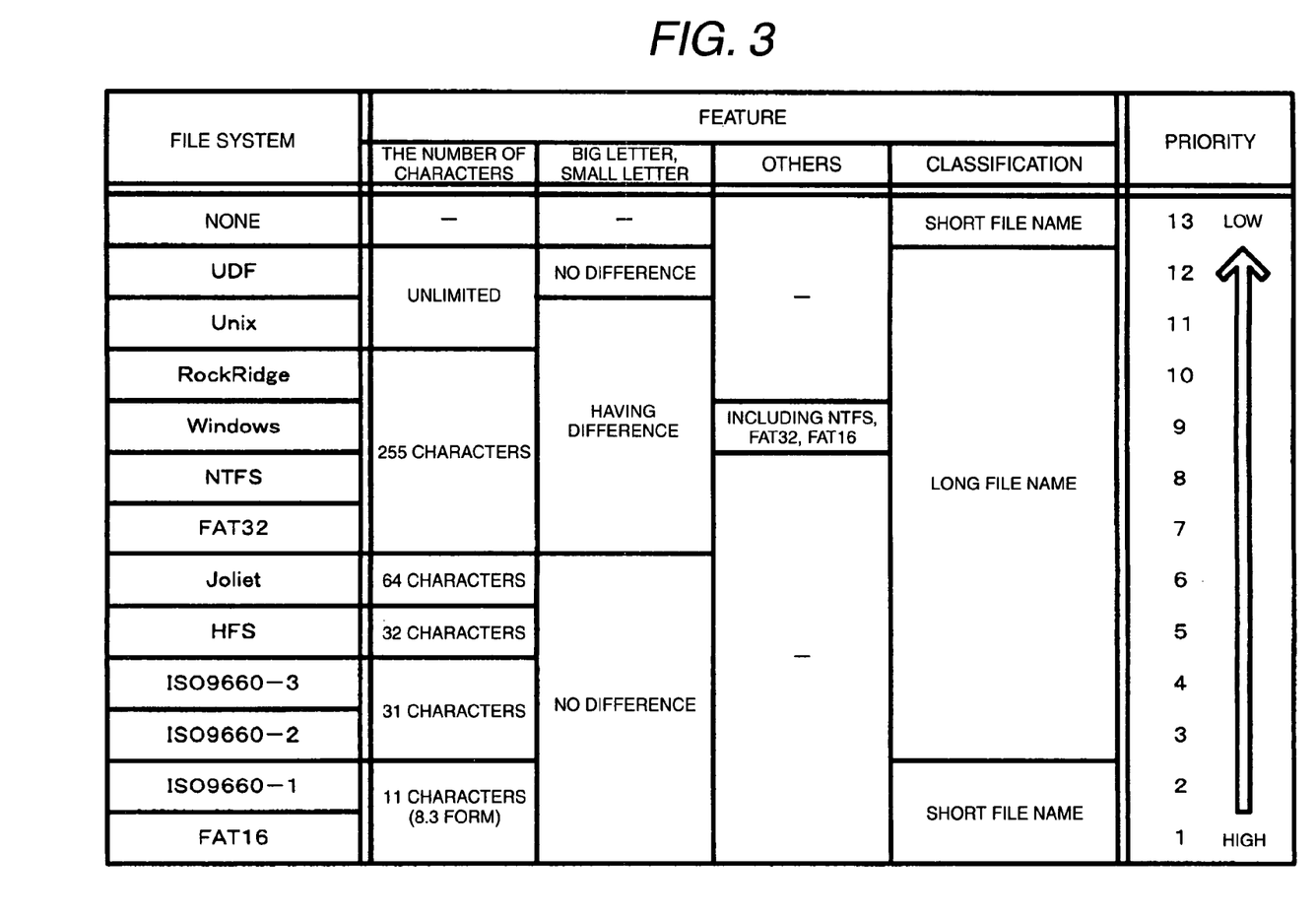
FIG. 3 is a diagram showing the features and the priority of file systems that can be described in the manifest.

FIG. 3 is shows the file systems (including a case that the file system tag 204 is not described) that can be described in the manifest 200, the features and the priority thereof. In this case, the number of characters herein indicates the number of characters of the file names excluding path information.

The file systems are different in their describing forms of the file names (for instance, whether or not the number of characters is limited or whether or not a big letter is discriminated from a small letter) or managing methods of an access right depending on a classification. Accordingly, in order to access the recorded file main body, a file name corresponding to the file system identical with the file system of the media needs to be used as a general rule. On the other hand, even when the describing forms of the file names are the same or the describing forms are different between certain file systems, the file systems may have compatibility. In such a case, even when the file names are the same or not the same between these systems, the file main body may be accessed by using the file name due to the compatibility of the file systems. Therefore, the file name corresponding to the file system identical with the file system of the media does not necessarily need to be used.

In FIG. 3, the features of the describing forms of the file names are described respectively for the file systems.

Ordinarily, the file names whose number of character is limited to a smaller value, a possibility that the file names are the same is the higher. For instance, both FAT16 and ISO9960-1 have the describing forms that the number of characters is limited to 11 with an 8.3 form and a big letter is not discriminated from a small letter. Thus, the possibility that the file names are the same is high. As compared therewith, though both FAT 32 and NTFS also have the same describing forms, the possibility that the file names are the same is low. Further, Windows (a registered trademark) includes NTFS, FAT32 and FAT16. Accordingly, when the file system of the media is the Windows (the registered trademark), the file name corresponding to the NTSF, the FAT 32 or the FAT 16 described in the manifest 200 may be possibly used so that the file can be accessed.

By considering the above-described features, the priority of the file systems can be determined so that a file system considered to have a higher possibility of the same file name as or a compatibility with the file system of the media is preferentially to become an object to be retrieved. The priority shown in FIG. 3 is determined on the basis of the above-described consideration. A table in which the file systems are allowed to correspond to the priority in FIG. 3 is a priority table. However, the priority shown in FIG. 3 indicates only one example. For instance, a priority table by which the file systems can be retrieved at higher speed may be statistically studied and changed.

The sequence of the file systems to be retrieved is determined on the basis of this priority table, so that the valid file names can be retrieved at higher speed.

Figure 4:
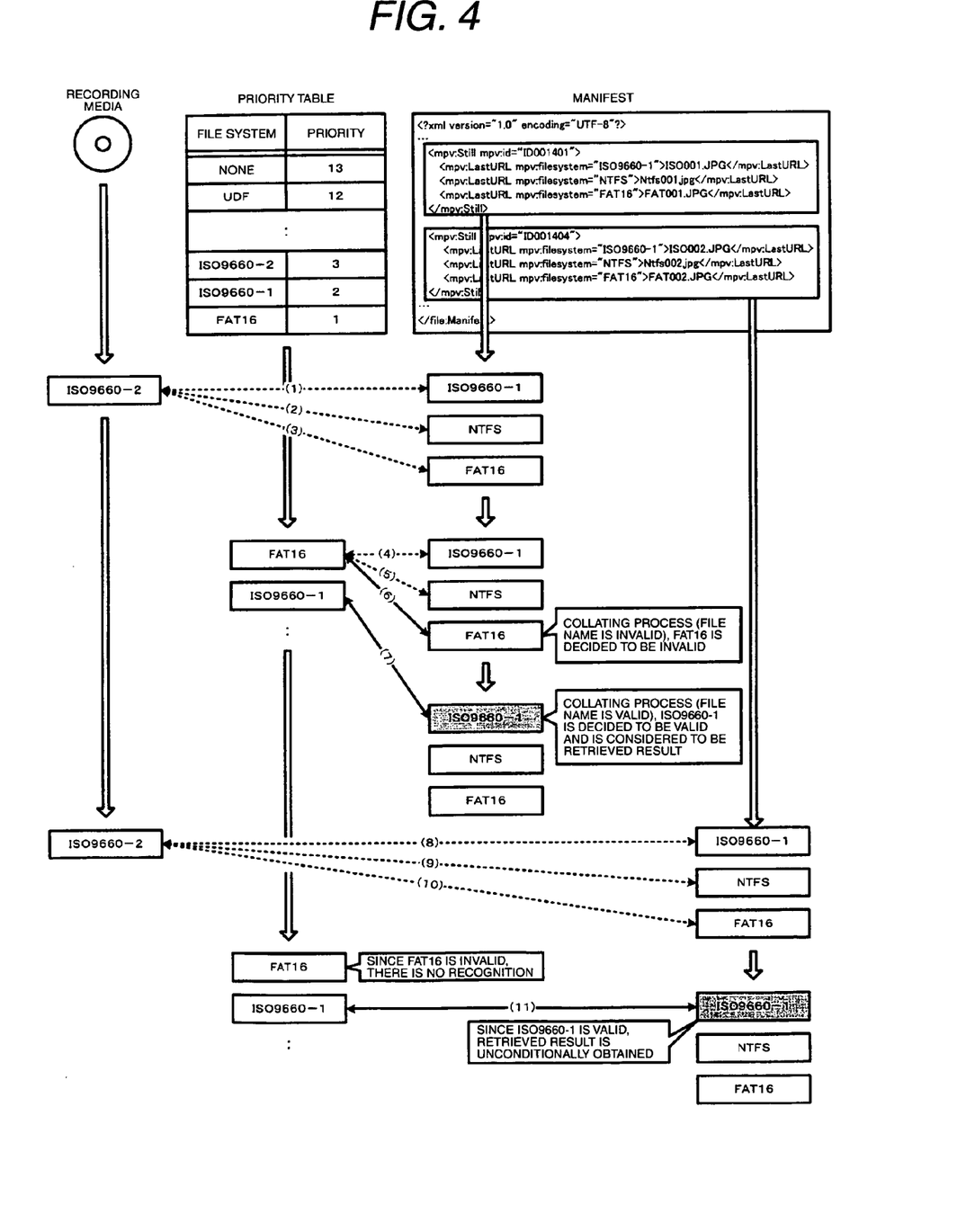
FIG. 4 is a diagram showing a procedure of a file retrieving process according to one embodiment of the present invention.

FIG. 4 shows a procedure of a file retrieving process according to this embodiment. Here, to explain the procedure of the file retrieving process, it is assumed that as the file system of the media, ISO9660-2 is used, as the manifest 200, the manifest shown in FIG. 2 is used and as the priority table, the priority shown in FIG. 3 is used, respectively.

Initially, as the first file main body information 209 described in the manifest 200, here, the information of the still image file ID001401 is set as an object to be retrieved. In the information of the still image file, three file names of ISO001.JPG, Ntfs001.jpg and FAT001.JPG are described and respectively correspond to ISO9660-1, NTFS and FAT16.

Firstly, the file retrieving part 105 retrieves the file name corresponding to the file system of the media in accordance with the media file system procedure. That is, the file retrieving part 105 compares the file system of the media with the above-described three file systems respectively to recognize whether or not the file system of the media corresponds to the file systems ((1), (2), (3)). In this case, since any of them does not correspond to the file system of the media, the media file system procedure is finished under a state the retrieved result is not obtained. The retrieving process shifts to the non-media file system procedure.

In the non-media file system procedure, the file names are retrieved in accordance with the above-described two principles. Namely, the sequence of the file systems to be retrieved is determined in accordance with the priority table. Referring to the priority table, since FAT16 has the highest priority, the file retrieving part 105 initially compares FAT16 with the above-described three file systems respectively to recognize whether or not FAT16 corresponds to the three file systems ((4), (5), (6)). Here, since FAT16 is included in the above-described three file systems, the corresponding file system is found (6)). Thus, the file retrieving part 105 controls the media reading part 104 to carry out the collating process and decides whether or not the file name of FAT001.JPG corresponding to FAT16 is valid. Here, when the FAT001.JPG is valid, this is considered to be the retrieved result to finish the retrieval of the information of the still image file of ID001401. However, here, an explanation will be given by assuming that the file name is invalid. When the collating process is carried out in such a way to decide that the file name is valid or invalid, the file retrieving part 105 stores the result thereof in the storing part 103 as information showing the validity or the invalidity of the file system. Namely, here, the file retrieving part 105 stores the information that FAT16 is invalid in the storing part 103.

After the retrieval of the FAT16 is completed, the file retrieving part 105 retrieves ISO9660-1 having a secondly highest priority as an object to be retrieved. Also in the case of ISO9660-1, since the corresponding file system is found ((7)), the file retrieving part 105 controls the media reading part 104 to carry out the collating process to decide whether or not the corresponding file name ISO001.JPG is valid. Here, when the IS0001.JPG is valid, the file retrieving part 105 stores information that the ISO9660-1 is valid in the storing part 103 to consider this file name to be the retrieved result and finishes the retrieving process of the information of the still image file of ID001401.

Then, second file main body information 209 described in the manifest 200, here, the information of a still image file of ID001404 is set as an object to be retrieved. In the information of the still image file, three file names of ISO002.JPG, Ntfs002.jpg and FAT002.JPG are described and respectively correspond to ISO9660-1, NTFS and FAT16 as in the first file main body information 209.

A procedure of a retrieving process is also the same as that of the first file main body information 209. That is, the file retrieving part 105 initially retrieves a file name corresponding to the file system of the media (8, 9, 10) in accordance with the media file system procedure. Also in this case, since there is no file name corresponding to the file system of the media, the media file system procedure is completed under a state that the retrieved result is not obtained and the retrieving process shifts to the non-media file system procedure.

In the non-media file system procedure, FAT16 having the highest priority is firstly retrieved. However, since it is already stored that the FAT16 is invalid, the file retrieving part 105 does not retrieve the FAT16 as an object to be retrieved to shift the object to be retrieved to ISO9660-1 having a secondly highest priority.

The collating process of the ISO9660-1 is already carried out to store the information that the ISO9660-1 is valid. Therefore, the file retrieving part 105 unconditionally considers file name of ISO002.JPG corresponding to the file system of ISO9660-1 to be the retrieved result without carrying out the collating process and finishes a retrieving process of the information of the still image file of ID001401.

The file retrieving part 105 carries out the retrieving processes according to the above-described method to all the file main body information described in the manifest 200 to obtain the retrieved results.

As described above, the result of the collating process of the file name previously retrieved in the file main body information 209 is used so that the collating process of subsequent file names can be omitted and the files can be retrieved at high speed.

Figure 5:
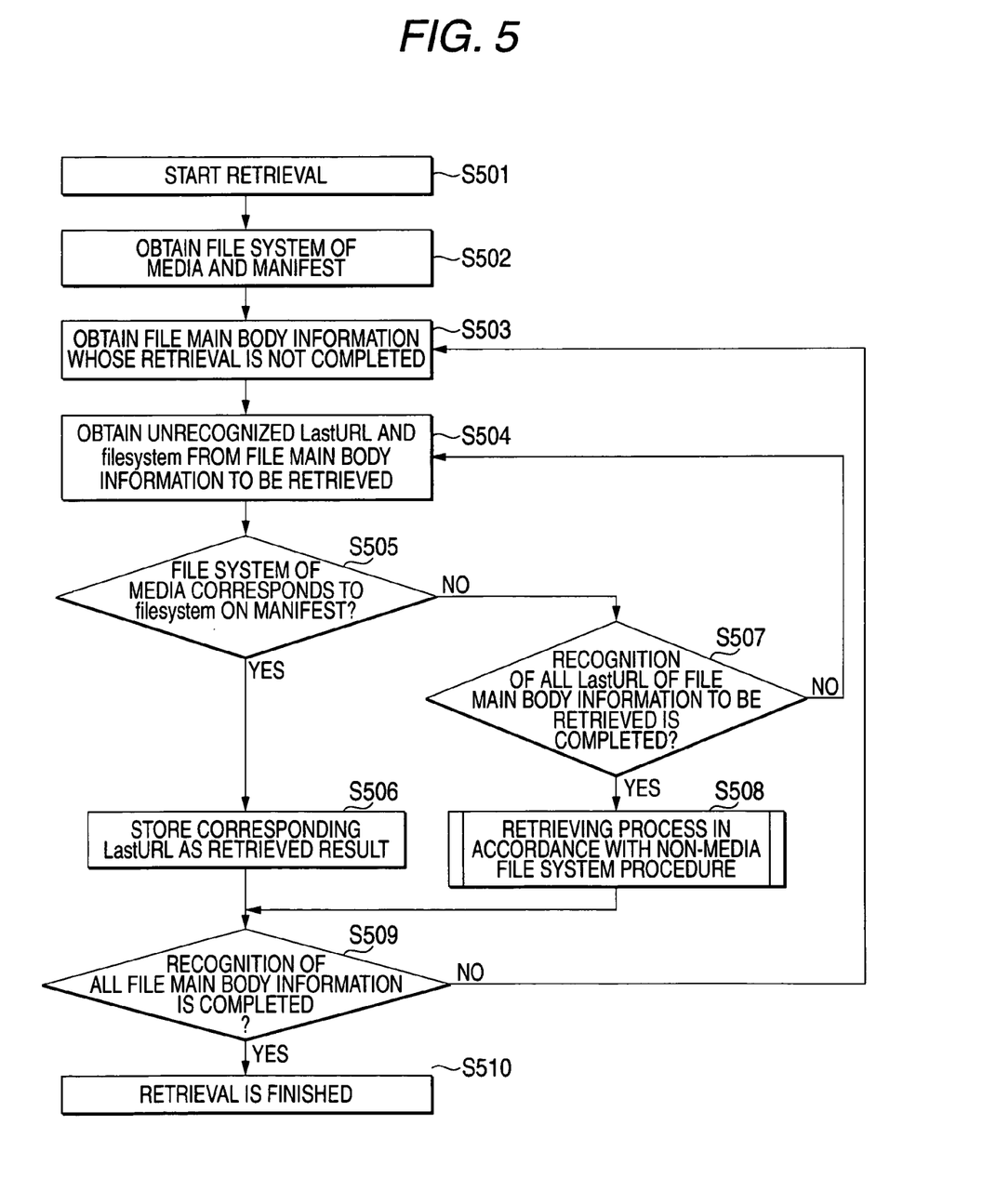
FIG. 5 is a flowchart of a procedure of a media file system according to the one embodiment of the present invention.
Figure 6:
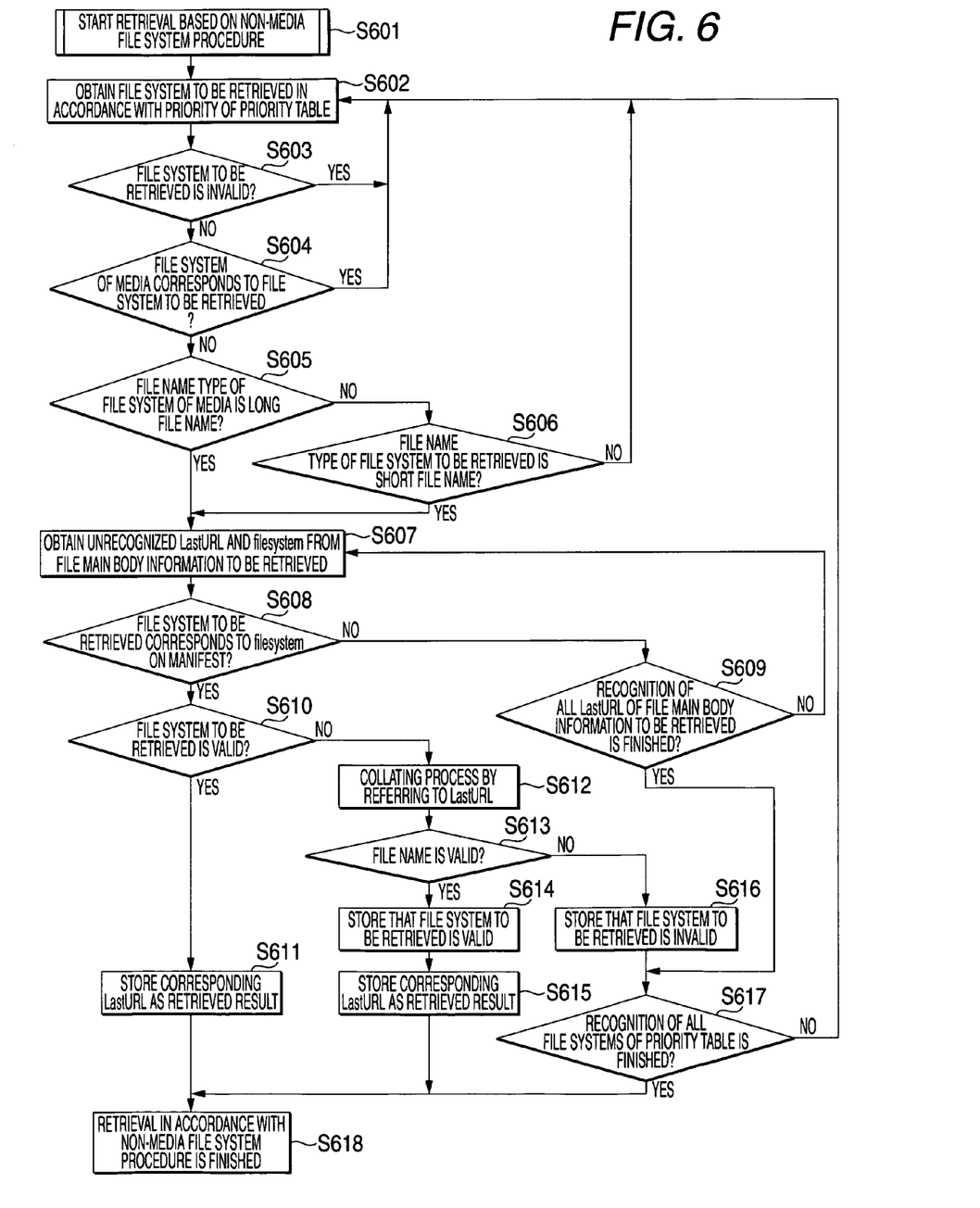
FIG. 6 is a flowchart of a procedure of a non-media file system of the file retrieving process according to the one embodiment of the present invention.

FIGS. 5 and 6 are flowcharts of a file retrieving process according to the embodiment of the present invention.

Especially, FIG. 5 shows the flowchart of the media file system procedure and FIG. 6 shows the flowchart of the non-media file system procedure, respectively. S508 in FIG. 5 corresponds to the non-media file system procedure shown in FIG. 6.

Now, referring to FIG. 5, a flow of the media file system procedure will be described below.

When the retrieving process is started (S501), the media reading part 104 reads the file system of the media and the manifest 200 from the recording media 106 to supply them to the file retrieving part 105 (S502). Then, the media file system procedure and the non-media file system procedure are carried out by the file retrieving part 105 that receives the file system of the media and the manifest 200.

Initially, the file retrieving part 105 grasps the file main body information 209 from the manifest 200 by using the Still tag 202 or the Audio tag 208 as the key. Then, the file main body information 209 in which the retrieval is not yet completed is considered to be an object to be retrieved to advance the retrieving process (S503).

Then, the file retrieving part 105 obtains the file names described in the manifest 200 together with the file systems thereof by using the LastURL tag 203 and the file system tag 204 as the keys from the file main body information 209 as the object to be retrieved (S504).

Here, the file retrieving part 105 recognizes whether or not the file system obtained in the S504 corresponds to the file system of the media (S505).

When the file systems correspond to each other (S505: YES), the file retrieving part 105 stores the file name obtained in the S504 in the storing part 103 as the retrieved result to complete the retrieving process of the file main body information 209 as the object to be retrieved (S506).

On the other hand, when the file systems do not correspond to each other (S505:NO), if all the file names of the file main body information 209 of the object to be retrieved are completely recognized (S507:YES), the non-media file system procedure is carried out (S508). Then, the file retrieving part 105 stores the retrieved result obtained by the non-media file system procedure in the storing part 103 to finish the retrieving process of the file main body information 209 as the object to be retrieved.

When all the file names of the file main body information 209 as the object to be retrieved are not completely recognized (S507:NO), a next file name and a file system are obtained to recognize whether or not the file system corresponds to the file system of the media.

After the retrieving process of the file main body information 209 as one object to be retrieved is completed, the file retrieving part 105 decides whether or not the retrieval of all the file main body information 209 described in the manifest 200 is completed (S509). If there is the file main body information 209 whose retrieval is not finished (S509:NO), the processes from S503 to S508 are repeated until the file main body information whose retrieval is not finished does not exist.

When all the file main body information 209 described in the manifest 200 is completely retrieved (S509:YES), the file retrieving process is completely finished (S510).

Now, referring to FIG. 6, a flow of the non-media file system procedure will be described below.

When the non-media file system procedure is started (S601), the file retrieving part 105 obtains the priority table from the storing part 103. Then, the file retrieving part 105 refers to the priority table to determine the file systems to be retrieved in order of higher priority (S602).

Here, it is decided whether or not the file systems determined in the S602 need to be retrieved (S603 to S606). Namely, when the collating process is already carried out to the file system and it is stored that the file system is invalid, the file system is not considered to be an object to be retrieved and the file system having a secondly highest priority is considered to be an object to be retrieved (S603:YES). Further, when this file system corresponds to the file system of the media, this file system is not considered to be the object to be retrieved (S604:YES), because the file system having the secondly highest priority is already considered to be the object to be retrieved in the media file system procedure. Further, when the file system of the media has a short file name and this file system has a long file name, this file system is not considered to be an object to be retrieved (S605:NO and S606:NO). In this case, a compatibility between the file system cannot be obtained and there is not possibility that the file main body can be accessed.

Then, the file retrieving part 105 obtains the file names described in the manifest 200 together with the file systems thereof by using the LastURL tag 203 and the file system tag 204 as the keys from the file main body information 209 as the object to be retrieved (S607).

Here, the file retrieving part 105 recognizes whether or not the file system obtained in the S607 corresponds to the file system as the object to be retrieved (S608).

When the file system does not correspond to the file system as the object to be retrieved (S608:NO), a recognition as to whether or not all file names of the file main body information 209 as the object to be retrieved correspond to the file system as the object to be retrieved is repeated (S607 to S609). When all the file names of the file main body information 209 as the object to be retrieved do not correspond to the file system as the object to be retrieved (S609:YES), the file retrieving part 105 tries to change the file system as the object to be retrieved (S617).

When the file system corresponds to the file system as the object to be retrieved (S608:YES), the file retrieving part 105 decides whether or not the file name obtained in the S607 is valid in accordance with a below-described method.

Namely, when the file system is already decided to be a valid file system by the collating process (S610;YES), the file name obtained in the S607 is unconditionally stored in the storing part 103 as the retrieved result of the file as the object to be retrieved (S611) to finish the retrieving process by the non-media file system procedure of the file as the object to be retrieved (S618).

On the other hand, when the collating process is not yet carried out (S610:NO), a collating process is carried out for recognizing whether or not the file main body can be accessed by the file name. As a result, when it is decided that the file name is valid (S613:YES), the file retrieving part 105 stores in the storing part 103 that the file system as the object to be retrieved is a valid file system (S614). Further, the file retrieving part 105 stores the file name in the storing part 103 as the retrieved result (S615) to finish the retrieving process by the non-media file system procedure of the file main body information 209 as the object to be retrieved (S618).

As a result of the collating process, when it is decided that the file name is invalid (S613:NO), the file retrieving part 105 stores in the storing part 103 that the file name is invalid (S616). After that, the file retrieving part 105 decides whether or not the file systems that are not yet considered to be objects to be retrieved remain in the priority table (S617). When the file systems that are not yet considered to be the objects to be retrieved do not remain (S617:YES), the retrieving process by the non-media file system procedure of the file main body information 209 as the object to be retrieved is finished (S618). On the contrary, when the file systems that are not considered to be the objects to be retrieved remain (S617: NO), the file system having a subsequently highest priority is selected as an object to be retrieved to repeat the same processes (S602 to S617).

Since the above-described retrieving process is carried out, when the recording media is read in which the different file names are attached to a plurality of file systems for the file main body and there is no file name corresponding to the file system of the recording media, a valid file name can be retrieved at high speed.

Accordingly, the file main body recorded on the recording media can be retrieved at high speed.

The above-described embodiment is simply exemplified for explaining the present invention and it is to be understood that the scope of the present invention is not limited to the above-described embodiment. The present invention may be embodied in other various ways without departing from the gist thereof.

For instance, in the above-described embodiment, each file main body information is read and the collating process of the file names included therein is carried out to decide the validity of the file system. However, before the file main body information is read, all or a part of the file systems may be previously decided to be valid.

According to the present invention, when the recording media is read in which the different file names are attached to the plurality of file systems for the file main body and there is no file name corresponding to the file system of the recording media, the valid file name can be retrieved at high speed.

What is claimed is:

1. A file retrieval device, operable to retrieve a valid file name for reading at least one file body from a recording medium in which a file body and file information related to the file body are recorded, the file information including file names each of which is allocated to the file body and each of which is related to respective one of file systems, which are different from each other, the recording medium being related to a first file system, the file retrieval device, comprising:
   a first extracting unit, when the first file system is included in the file systems and the first file system is identical with one of the file systems that is related to a first one of the file names, operable to extract the first one of the file names;
   a validity deciding unit operable to access the file body with the file names when the first file system is not included in the file systems, the validity deciding unit operable to decide that at least one of the file names is valid when the validity deciding unit can access the file body with the at least one of the file names;
   a second extracting unit, operable to extract at least a second one of the file names that is decided to be valid by the validity deciding unit; and
   an output unit, operable to output at least one of the first one of the file names extracted by the first extracting unit and the at least second one of the file names extracted by the second extracting unit; wherein
   the validity deciding unit decides:
   that at least one of the file systems that is related to the at least one of the file names that is decided to be valid is a valid file system; and
   that the other of the file systems that is related to the other of the file names that is decided to be not valid is a non-valid file system,
   the second extracting unit obtains the file names when the first file system related to the recording medium is not included in the file systems,
   when the obtained file names include a first file name which is related to the valid file system, the second extracting unit extracts the first file name,
   when the obtained file names include a second file name which is related to the non-valid file system, the second extracting unit does not extract the second file name,
   when the obtained file names includes a third file name which is related to a non-decided file system that is not decided to be the valid file system or the non-valid file system, the second extracting unit causes the validity deciding unit to decide validity of the non-valid file system and extracts or does not extract the third file name in accordance with the decision of the validity.

2. The file retrieval device according to claim 1, wherein the validity deciding unit specifies the file systems in accordance with a predetermined priority and decides the validity of the file names related to the specified file systems.

3. The file retrieval device according to claim 2, wherein a third one of the file names has a first number of characters, a fourth one of the file names has a second number of characters which is larger than the first number of characters, and
   the third one of the file names is higher than the fourth one of the file names in the priority.

4. A file retrieval method of retrieving a valid file name for reading at least one file body from a recording medium in which a file body and file information related to the file body are recorded, the file information including file names each of which is allocated to the file body and each of which is related to respective one of file systems which are different from each other, the recording medium related to a first file system, the file retrieval method, comprising:
   a first step, when the first file system is included in the file systems and the first file system is identical with one of the file systems that is related to a first one of the file names, that extracts the first one of the file names;
   a second step that accesses the file body with the file names when the first file system is not included in the file systems, and that decides that at least one of the file names is valid when the file body can be accessed with the at least one of the file names; and
   a third step that extracts the at least second one of the file names that is decided to be valid; wherein
   the second step further decides that at least one of the file systems that is related to the at least one of the file names that is decided to be valid is a valid file system; and
   that the other of the file systems that is related to the other of the file names that is decided to be not valid is a non-valid file system,
   the third step further obtains the file names when the first file system related to the recording medium is not included in the file systems,
   when the obtained file names include a first file name which is related to the valid file system, extracts the first file name,
   when the obtained file names include a second file name which is related to the non-valid file system, does not extract the second file name, and
   when the obtained file names includes a third file name which is related to a non-decided file system that is not decided to be the valid file system or the non-valid file system, causes the second step to decide validity of the non-valid file system and extracts or does not extract the third file name in accordance with the decision of the validity.

5. A computer-readable recording medium in which a computer program causing a computer to execute the method according to claim 4 is recorded.

* * * * *